(12) United States Patent
Chaudhry

(10) Patent No.: US 7,774,487 B2
(45) Date of Patent: Aug. 10, 2010

(54) METHOD AND APPARATUS FOR CHECKING THE HEALTH OF A CONNECTION BETWEEN A SUPPLEMENTAL SERVICE PROVIDER AND A USER DEVICE OF A PRIMARY SERVICE PROVIDER

(75) Inventor: Kapil Chaudhry, Cerritos, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 224 days.

(21) Appl. No.: 11/958,953

(22) Filed: Dec. 18, 2007

(65) Prior Publication Data

US 2009/0157868 A1 Jun. 18, 2009

(51) Int. Cl.
*G06F 15/16* (2006.01)
(52) U.S. Cl. ............ 709/231; 709/223; 709/228; 713/170
(58) Field of Classification Search ............ 709/223, 709/227, 229, 231, 238; 713/170
See application file for complete search history.

(56) References Cited

U.S. PATENT DOCUMENTS

| 6,731,832 | B2 * | 5/2004 | Alvarez et al. ............... 385/16 |
| 6,973,229 | B1 * | 12/2005 | Tzathas et al. ............... 385/16 |
| 7,209,963 | B2 * | 4/2007 | Burton et al. ............... 709/223 |
| 2003/0097563 | A1 * | 5/2003 | Moroney et al. ............ 713/170 |
| 2007/0276957 | A1 * | 11/2007 | King et al. .................. 709/238 |
| 2009/0013087 | A1 * | 1/2009 | Lorch et al. ................. 709/232 |

* cited by examiner

*Primary Examiner*—Khanh Q Dinh

(57) ABSTRACT

A system and method for communicating between a secondary content provider and a user device includes a user device locator module and a primary service provider providing primary service content to the user device. The user device communicates a user device identifier, an IP address and a port number to the user device locator module. A secondary service content provider in communication with the user device locator module provider has a healthcheck module receiving the IP address and the port number from the user device locator module. The healthcheck module communicates a healthcheck signal to the user device using the port number and the IP address of the user device through a network. The secondary service content provider communicates secondary content to the user device through the network.

32 Claims, 2 Drawing Sheets

METHOD AND APPARATUS FOR CHECKING THE HEALTH OF A CONNECTION BETWEEN A SUPPLEMENTAL SERVICE PROVIDER AND A USER DEVICE OF A PRIMARY SERVICE PROVIDER

TECHNICAL FIELD

The present disclosure relates generally to communication systems having a primary service provider and a supplemental service provider, and more particularly, to a method and system for checking the health of a connection between the supplemental service provider and a user device of the primary service provider.

BACKGROUND

The statements in this section merely provide background information related to the present disclosure and may not constitute prior art.

Communication systems such as pay communication systems include a primary service provider and a user device. The user device is typically provided with authorization to communicate with the primary service provider and receive services therefrom. One example of such a system is a satellite television system such as DIRECTV®. Conditional access is provided at the user device in the form of a card to allow the user device to receive signals from the primary service provider.

Allowing other service providers to interact with and provide different services that supplement the primary service, may be desirable. However, the supplemental service provider may not know if the user device is in communication with the supplemental service provider. In a broadband-type of communication system, the ports that the communication device communicates over or the IP address of the user device, or both, may be subject to change.

SUMMARY

The present disclosure allows the supplemental service provider to maintain and determine the health of a connection between the supplemental service provider and a user device of a primary service provider.

In one aspect of the invention, a method includes providing primary service content to a user device from a primary service provider, communicating a user device identifier, an (Internet Protocol) IP address and a port number from a user device associated with a primary service provider to a user device locator module, updating a healthcheck module in response to the IP address and the port number, communicating a healthcheck signal to the user device using the port number and the IP address of the user device through a network and providing secondary service content to the user device through the network.

In a further aspect of the invention, a method includes communicating a user device identifier and an access card identifier to an authentication server from a user device, authenticating a user device at the authentication server, communicating an encrypted token, an account identifier, a root certificate and a user device certificate and a private key from the authentication server to the user device, communicating an IP address, a port number a service offered on other ports and a user device encryption key to a user device locator, communicating the IP address and port number of the user device at a healthcheck module, sending a ping message from the healthcheck module to the user device using the IP address and the port number and sending a response message from the user device to the healthcheck module.

In yet another aspect of the invention, a system includes a user device, a user device locator module and a primary service provider providing primary service content to the user device. The user device communicates a user device identifier, an IP address and a port number the user device locator module. A secondary service content provider in communication with the user device locator module provider has a healthcheck module receiving the IP address and the port number from the user device locator module. The healthcheck module communicates a healthcheck signal to the user device using the port number and the IP address of the user device through a network. The secondary service content provider communicates secondary content to the user device through the network.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
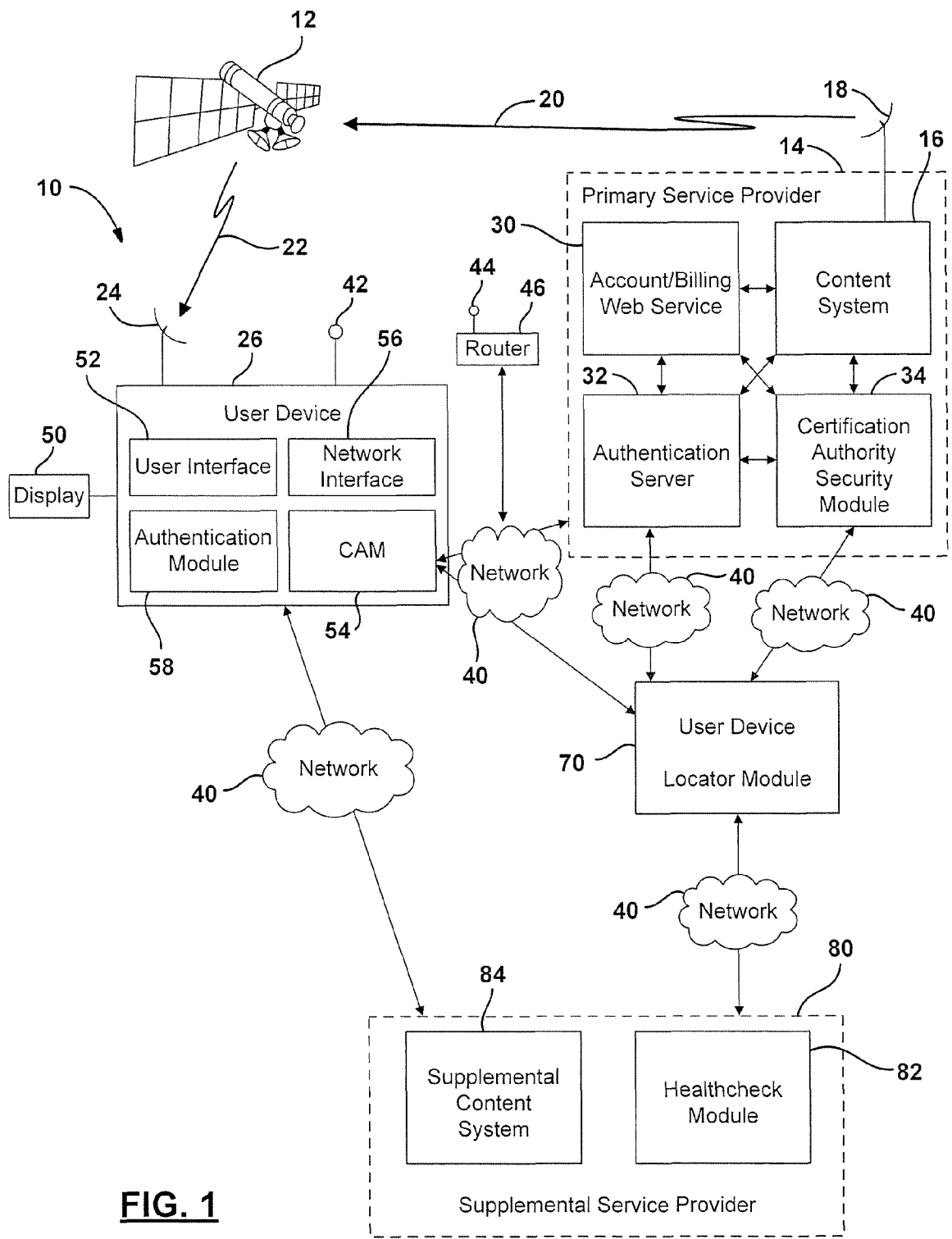
FIG. 1 is a block diagrammatic view of a communication system including a primary service provider, a supplemental service provider and a user device.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Referring now to FIG. 1, a satellite television broadcast system 10 is illustrated. The satellite television broadcast system 10 is illustrated by way of example. However, the present invention is not limited hereto as mentioned above. The television broadcast system 10 includes a satellite 12 that receives content or programming from a primary service provider 14. More specifically, the primary service provider 14 includes a content system 16 that generates uplink signals 20 through an uplink antenna 18. The uplink signals 20 may be television signals and more specifically digital television signals. The uplink antenna 18 communicates the uplink signals 20 to the satellite 12 which in turn generates downlink signals 22. The downlink signals 22 are communicated to a receiving antenna 24 on a user device 26. Although only one user device 26 is illustrated, several user devices may be provided in a broadcasting system 10. The uplink signals 20 and downlink signals 22 may be referred to as communication signals. Communication signals are wireless communication signals and may include various types of entertainment content, traffic, weather, hazardous material warnings, advertising material, and the like. As mentioned above, this system may be suitable for wired systems such as cable televisions and terrestrial wireless systems.

The user device 26 may include a satellite television receiver or set top box. The satellite television receiver may also be referred to as an integrated receiver decoder. Of course, other types of user devices may be used such as a cable television set top box. Other types of user devices may include a mobile device such as a lap top computer, cellular phone, personal digital assistant, a portable media player or an automotive-based television receiving device. Thus, the user device may be a fixed user device in the case of a satellite television set top box or a mobile user device. Both fixed and mobile devices may be used in a system.

The primary service provider 14 may also include an account/billing web service 30, an authentication server 32, and a certification authority service module 34.

The user device 26 is in communication with the primary service provider 14 through a network 40. The network 40 may be a secured network or uses a secure protocol. The network 40 may include a broadband network through which the user device 26 communicates with the primary service provider 14. The network 40 may be a wired network such as a public-switched telephone network (PSTN) or a broadband network. The broadband network may communicate wired, wirelessly or a combination of both. For example, the user device 26 may include a wireless antenna 42 for communicating with an antenna 44 of a router 46 which, in turn, is in communication with the network 40.

The user device 26 may be associated with a display 50 for displaying content and programming, as well as displaying various types of user commands, or the like. The display 50 may be a television or an integrated display. The display 50 may include speakers for an audio display. The display 50 may be used for displaying primary content from a primary service provider and secondary content from a secondary service provider.

The user device 26 may include an interface 52, such as a keyboard, remote control, or the like, for selecting and entering various types of information by the user. The user device may also include a conditional access module 54 that allows the user to access the programming provided from the content system 16. The conditional access module 54 may be referred to as an access card. The conditional access module 54 may include various activation codes without which the user device is not activated. The conditional access module 54 may include a conditional access module identifier such as a number or a code.

The user device 26 may also include a network interface 56 for interfacing with the network 40. For example, the network interface 56 may communicate wirelessly through the antenna 42 or through a direct connection such as an Ethernet connection. The network interface 56 may be a wireless broadband interface, a broadband interface, a modem-type interface or a public-switched telephone network interface.

The network interface 56 may communicate with the network 40 through a port. A port monitoring system 58 may also be included within the user device. The port monitoring system 58 may be used for monitoring the port for incoming pings and responding with responses thereto.

The authentication server 32 of the primary service provider 18 may be used to authenticate the various user devices 26 within the system 10. Each user device 26 may send a receiver ID that may correspond to a serial number of the user device 26. The receiver ID may be stored in a memory and may be referred generally to as a user device identifier. The receiver device ID and a conditional access module or card ID may be communicated to the authentication server 32 through the network 40. The authentication server 32 may communicate with the account/billing web service 30 to determine if the proper receiver ID and card ID are associated together. The authentication server 32 may communicate with the certification authority security module 34 to retrieve a root certificate, a user device certificate and a private key for encryption.

After the user device 26 is authenticated with the primary provider 14, the user device 26 may communicate with a user device locator module 70 through the network 40. The user device 26 may send the IP address of the user device, the port and the type of service offered on the ports to the user device locator module 70. Also, the user device encryption key may be provided from the user device 26 to the user device locator module 70. The user device locator module 70 may be a stand-alone device or it may be incorporated into the primary service provider 14. The user device locator module 70 may also be in communication with the certification authority security module 34. The user device locator module 70 may obtain a certificate and a root certificate from the certification authority module 34.

The user device locator module 70 may be in communication with a supplemental service provider 80. The supplemental service provider 80 may include a healthcheck module 82 and a supplemental content system 84. The user device locator module 70 may be used to provide set top box port registration information from the user device. That is, the user device locator module 70 may include the IP address, port, service offered on the ports and the user device encryption key stored therein. When the information from the various user devices 26 is stored in the user device locator module 70, the healthcheck module 82 may detect the registration of a new device and stored, at minimum, the IP address port and identifier for the user device 26. The healthcheck module 82 may be a server such as a ping server that is used to communicate with the user device 26 using various protocol. For example, the healthcheck module 82 may be used to check the health of the connection between the supplemental service provider 80 and the user device 26. Various types of communications may take place, including Secure Shell Version 1 (SSH1). That is, an SSH1 encrypted P-hash which is a hash map of the content sent by the healthcheck module 82, may be communicated to the user device 26 at various times throughout the day. The communications may take place periodically, upon a schedule or may be triggered through activity at the user device locator module 70. The hash map may be calculated using an HMAC-SSH1 configuration. In addition to the SSH1 encrypted P-hash, a ping message may also be communicated. The ping message is communicated to the port and the port monitoring system 58 of the user device 26 may generate an ok or "connected" response to the healthcheck module 82 if the connection is maintained.

The supplemental content system 84 may provide various types of content to supplement the content provided by the primary service provider. The supplemental content may, for example, be various types of content including financial information, weather information, voicemail information, or other types of information. The supplemental content system 84 may provide the content to be displayed on a special channel within the user device 26 or overlayed with the content provided from the primary service provider 14.

Figure 2:
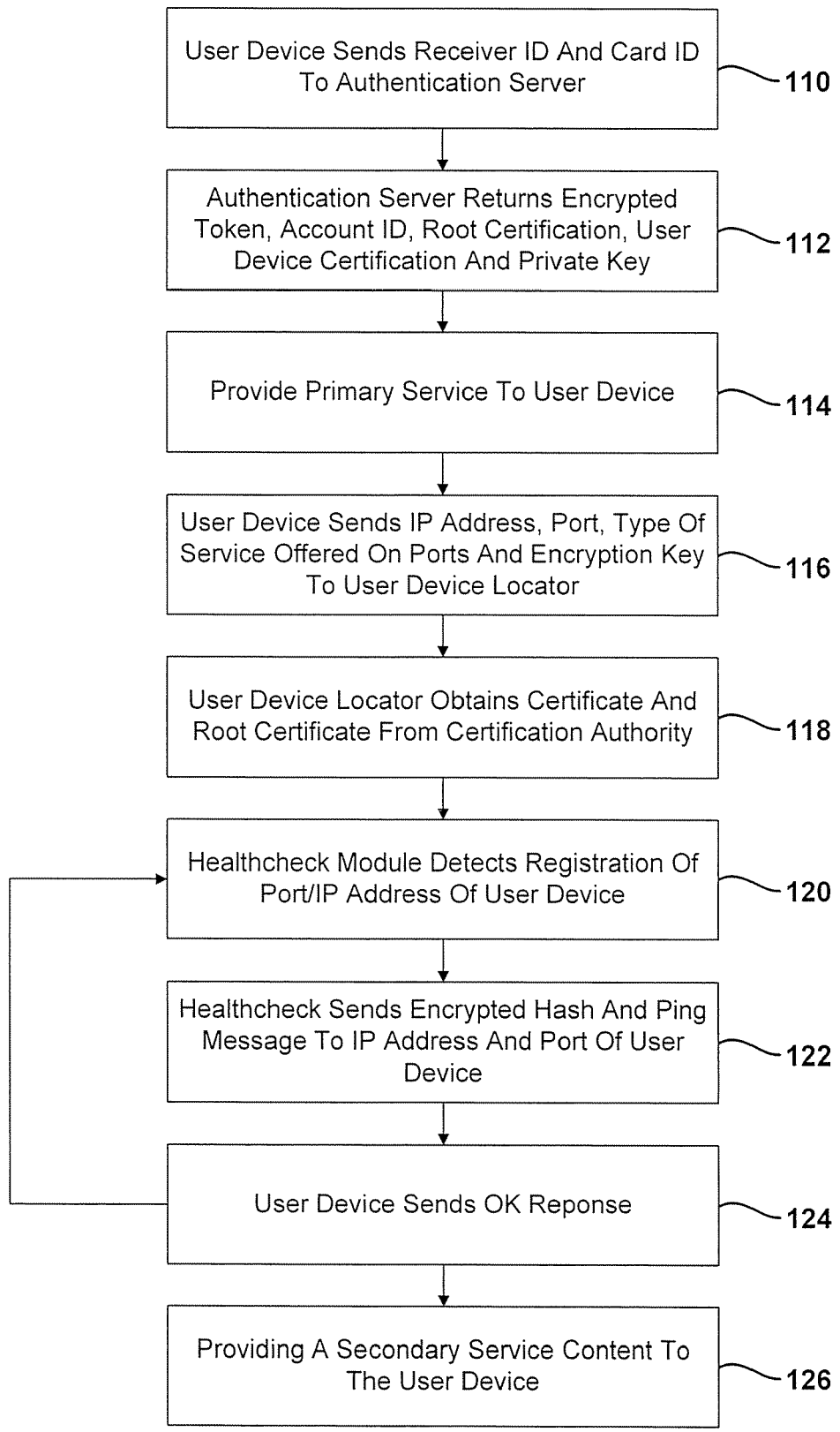
FIG. 2 is a flowchart of a method for maintaining the health of the connection between the supplemental service provider and the user device.

Referring now to FIGS. 1 and 2, a method for determining the health of a connection between a supplemental service provider 80 and a user device 26 is set forth. The user device 26 is first authenticated by the primary service provider system 14. In step 110, the user device 26 sends a receiver ID, such as the serial number or other type of identifier, and an access card identifier to the authentication server 32. In step 112, the authentication server returns an encrypted token, an account ID, a root certificate, a user device certificate and private key. The information returned from the authentication server may be referred to as authentication identification. All or some of the above-mentioned items may be returned from the authentication server 32. In step 114, the user device 26 is authenticated. Step 114 allows the primary service provider 14 to communicate with the user device 26 so that the user device 26 receives information from the system.

In step 116, the user device sends an IP address, a port number, the type of service offered on the ports and an encryption key to the user device locator. Examples of a service are the public IP addresses, port forwarding or the like. In step 118, the user device locator may obtain a certificate and a root certificate from the certification authority. The user device locator module 70 may use the root certificate and the certificate to communicate both with the user device 26 and with the supplemental service provider. More specifically, the user device locator module may use the certificate and root certificate to communicate with the healthcheck module 82 of FIG. 1.

In step 120, the healthcheck module may be triggered to determine the healthcheck status of the connection between the supplemental service provider 80 and the user device 26 in various ways. The healthcheck module 18 may maintain its own database. In step 120, the healthcheck module may be used to detect a change in registration of the port/IP address of a user device. The new port/IP address of a user device may be communicated to the healthcheck module 82 when entered into the user device locator module. Also, the healthcheck module 82 may receive updates from existing user devices for updating.

In step 122, the healthcheck module 82 may send an encrypted hash and a ping message to the IP address and port for a particular user device. In response to the ping message, the user device may send a response such as an "ok" response in step 124. The healthcheck module 82 may continually or periodically send ping messages to the IP address and port of the user device 26 so that supplemental services may be provided. By knowing the health of the connection, the supplemental service provider knows that particular information may be communicated to the user device 26.

In step 126, secondary service content provider 80 may provide secondary service content to the user device through the network connection 40.

It should be noted that, although a single network 40 is illustrated between various types of devices, different types of networks may be used in different locations. For example, a wired internet connection, a wireless internet connection, a telephone connection, or the like may be used at one or all of the networks 40.

The steps 122 and 124 described above may be performed when new receiver values are stored in the user device locator module. They may also be scheduled within the healthcheck module 82 to be performed at various times. For example, scheduled requests may be provided during the normal maintenance process. The healthcheck module 82 may include a scheduler that schedules, processes and creates a thread pool large enough to handle the process. Each of the thread pools may be used to process the data from individual sets of data for a raise. Each data request may be sent to the user device according to the values extracted from the table, including the IP address and the port. Thus, step 122 may be performed as a batch process for various numbers of user devices in the primary service provider system.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:

providing primary service content to a user device from a primary service provider;

communicating a user device identifier, an IP address and a port number from a user device associated with a primary service provider to a user device locator module;

updating a healthcheck module of a secondary service provider in response to the IP address and the port number;

communicating a healthcheck signal to the user device using the port number and the IP address of the user device through a network;

communicating a status signal corresponding to a status of a connection between the secondary service provider and the user device to the secondary service provider; and providing secondary service content to the user device through the network after communicating the status signal.

2. A method as recited in claim 1 further comprising prior to providing primary service content, communicating a request for authentication from a user device to an authentication server;
  authenticating a user device at the authentication server and generating authentication data at the authentication server; and
  communicating the authentication data to the user device.

3. A method as recited in claim 2 wherein communicating a request for authentication comprises communicating a user device identifier to the authentication server.

4. A method as recited in claim 2 wherein communicating a request for authentication comprises communicating an access card identifier to the authentication server.

5. A method as recited in claim 2 wherein communicating a request for authentication comprises communicating an access card identifier and a user device identifier to the authentication server.

6. A method as recited in claim 1 wherein generating authentication data comprises generating an encrypted token.

7. A method as recited in claim 1 wherein generating authentication data comprises generating at least two of an encrypted token, an account identifier, a root certificate, a private key and a user device certificate.

8. A method as recited in claim 1 wherein generating authentication data comprises generating at least three of an encrypted token, an account identifier, a root certificate, a private key and a user device certificate.

9. A method as recited in claim 1 wherein communicating the healthcheck signal comprises communicating a hash signal and a ping signal.

10. A method as recited in claim 1 wherein updating a healthcheck module comprises periodically updating the healthcheck module with user device information.

11. A method as recited in claim 1 wherein communicating the healthcheck signal comprises periodically communicating healthcheck signal to the user device.

12. A method as recited in claim 1 wherein providing primary service content to a user device from a primary service provider comprises providing primary service content to a user device from a satellite television provider.

13. A method as recited in claim 1 wherein providing primary service content to a user device from a primary service provider comprises providing primary service content to a satellite television receiving device from a primary service provider.

14. A method comprising:
  communicating a user device identifier and an access card identifier to an authentication server from a user device;
  authenticating a user device at the authentication server;
  communicating an encrypted token, an account identifier, a root certificate, a user device certificate and a private key from the authentication server to the user device;
  communicating an IP address, a port number, a service offered on other ports and a user device encryption key to a user device locator;
  communicating the IP address and port number of the user device to a healthcheck module;
  sending a ping message from the healthcheck module to the user device using the IP address and the port number; and
  sending a response message from the user device to the healthcheck module corresponding to a status of a connection to the user device.

15. A method as recited in claim 14 further comprising providing secondary service content to the user device through the network.

16. A method as recited in claim 14 wherein the user device identifier comprises a receiver device identifier.

17. A method as recited in claim 14 further comprising obtaining a locator certificate and a root certificate from a certification authority security module at the user device locator.

18. A method as recited in claim 14 wherein communicating a ping message comprises communicating a hash signal and the ping signal.

19. A method as recited in claim 14 further comprising communicating a status signal from the user device to the healthcheck module in response to the ping signal.

20. A method as recited in claim 14 further comprising updating the healthcheck module periodically.

21. A method as recited in claim 14 wherein communicating the healthcheck signal comprises periodically communicating the ping signal to the user device.

22. A method as recited in claim 14 wherein providing primary service content to a user device from a primary service provider comprises providing primary service content to a user device from a satellite television provider.

23. A method as recited in claim 14 further comprising providing primary service content to a user device from a primary service provider.

24. A method as recited in claim 23 wherein providing primary service content to a user device from a primary service provider comprises providing primary service content to a satellite television receiving device from a primary service provider.

25. A system comprising:
  a user device;
  a user device locator module;
  a primary service provider providing primary service content to the user device;
  said user device communicating a user device identifier, an IP address and a port number to the user device locator module;
  a secondary service content provider in communication with the user device locator module provider having a healthcheck module, said secondary service content provider receiving the IP address and the port number from the user device locator module;
  said healthcheck module communicating a healthcheck signal to the user device using the port number and the IP address of the user device through a network;
  said user device communicating a status signal to the secondary service content provider in response to the healthcheck signal; and
  said secondary service content provider communicating secondary content to the user device through the network after receiving the status signal.

26. A system as recited in claim 25 further comprising an authentication server authenticating the user device.

27. A system as recited in claim 25 further comprising an authentication server authenticating the user device in response to a receiver identifier, an access card identifier or both.

28. A system as recited in claim 25 wherein the network comprises a telephone network.

29. A system as recited in claim 25 wherein the network comprises a broadband network.

30. A system as recited in claim 25 further comprising a satellite communicating primary content to the user device from the primary service provider.

31. A system as recited in claim 25 wherein the user device comprises a satellite television set top box.

32. A system as recited in claim 25 wherein the user device comprises a mobile user device.

* * * * *